(12) United States Patent
Hoffman et al.

(10) Patent No.: US 12,484,478 B2
(45) Date of Patent: Dec. 2, 2025

(54) QUICK RELEASE BLADE ASSEMBLIES AND METHODS FOR A POWER TOOL

(71) Applicant: Techtronic Cordless GP, Anderson, SC (US)

(72) Inventors: Ronald J. Hoffman, Iva, SC (US); Lance Eckard, Anderson, SC (US)

(73) Assignee: TECHTRONIC CORDLESS GP, Anderson, SC (US)

( * ) Notice: Subject to any disclaimer, the term of this patent is extended or adjusted under 35 U.S.C. 154(b) by 794 days.

(21) Appl. No.: 17/835,296

(22) Filed: Jun. 8, 2022

(65) Prior Publication Data

US 2022/0394919 A1    Dec. 15, 2022

Related U.S. Application Data

(60) Provisional application No. 63/208,808, filed on Jun. 9, 2021.

(51) Int. Cl.
*A01D 34/73* (2006.01)
*A01D 34/68* (2006.01)
*A01D 101/00* (2006.01)

(52) U.S. Cl.
CPC ........ *A01D 34/733* (2013.01); *A01D 34/6806* (2013.01); *A01D 2101/00* (2013.01)

(58) Field of Classification Search
CPC ............... A01D 34/733; A01D 34/412; A01D 34/4165; A01D 34/4166; A01D 34/6806; A01D 2101/00
USPC .................... 30/276, 347; 56/10.3, 11.8, 12.7
See application file for complete search history.

(56) References Cited

U.S. PATENT DOCUMENTS

| | | | | |
|---|---|---|---|---|
| 2,232,261 A | * | 2/1941 | Orr ........................ | A01D 34/78 56/255 |
| 3,252,304 A | * | 5/1966 | Moody .................... | F16D 7/08 464/36 |
| 4,235,068 A | * | 11/1980 | Comer ................. | A01D 34/416 56/13.4 |

(Continued)

FOREIGN PATENT DOCUMENTS

| CN | 202222156 U | 5/2012 |
|---|---|---|
| CN | 204539949 U | 8/2015 |

(Continued)

OTHER PUBLICATIONS

European Search Report Corresponding with Application No. EP22176162 on Oct. 31, 2022 (2 pages).

*Primary Examiner* — Joseph M Rocca
*Assistant Examiner* — Sunny D Webb
(74) *Attorney, Agent, or Firm* — Dority & Manning, P.A.

(57) ABSTRACT

Quick release blade assemblies for a power tool are provided. A lawnmower includes a base including an engagement interface; a retainer having a locking component; a blade disposed between the base and the retainer; and an actuatable member including an engagement member, the engagement member being selectively displaceable with respect to the engagement interface between a locked configuration and an unlocked configuration when the actuatable member is translated in a direction parallel with the axis of rotation, wherein the engagement member is configured to interface with the locking component to selectively couple the blade to the drive shaft when the engagement member is in the locked configuration.

20 Claims, 5 Drawing Sheets

(56) References Cited

U.S. PATENT DOCUMENTS

| | | | |
|---|---|---|---|
| 5,622,035 A * | 4/1997 | Kondo | A01D 34/736 56/DIG. 17 |
| 6,205,755 B1 | 3/2001 | Bontrager | |
| 6,389,786 B1 * | 5/2002 | Bergsten | A01D 75/30 56/255 |
| 6,688,095 B2 | 2/2004 | Wadzinski | |
| 7,124,566 B2 | 10/2006 | Treger | |
| 7,614,153 B2 | 11/2009 | Guerra | |
| 7,784,254 B2 | 8/2010 | Bever | |
| 8,136,333 B1 | 3/2012 | Levin | |
| 8,769,831 B2 | 7/2014 | Duvall | |
| 8,869,369 B1 | 10/2014 | Roach | |
| 9,113,595 B2 * | 8/2015 | Roth | A01D 34/664 |
| 9,560,800 B2 | 2/2017 | Reichen | |
| 9,750,183 B2 | 9/2017 | Haun | |
| 9,924,632 B2 | 3/2018 | Chenevert | |
| 10,123,479 B2 | 11/2018 | Ladd, Jr. | |
| 10,327,384 B2 | 6/2019 | Johansson | |
| 10,426,082 B1 | 10/2019 | Dallman | |
| 10,517,212 B2 | 12/2019 | Haun | |
| 10,531,609 B2 | 1/2020 | Jerez | |
| 2013/0269192 A1 | 10/2013 | Pellenc | |
| 2014/0041353 A1 * | 2/2014 | MacDonald | A01D 34/84 56/12.7 |
| 2015/0107118 A1 * | 4/2015 | Banjo | A01D 34/4166 29/401.1 |
| 2020/0253117 A1 | 8/2020 | Guerra | |

FOREIGN PATENT DOCUMENTS

| | | |
|---|---|---|
| CN | 105075498 B | 11/2015 |
| CN | 204762137 U | 11/2015 |
| CN | 204796177 U | 11/2015 |
| CN | 105612905 B | 6/2016 |
| CN | 105850345 B | 8/2016 |
| CN | 107593087 A | 1/2018 |
| CN | 208163276 U | 11/2018 |
| CN | 109618646 A | 4/2019 |
| CN | 209017454 U | 6/2019 |
| CN | 209949877 U | 1/2020 |
| DE | 6753044 U | 3/1969 |
| DE | 102016213259 A1 | 1/2017 |
| EP | 1867226 B1 | 12/2007 |
| EP | 2798937 B1 | 11/2014 |
| EP | 3081064 B1 | 10/2016 |
| EP | 3760023 A1 | 1/2021 |

* cited by examiner

QUICK RELEASE BLADE ASSEMBLIES AND METHODS FOR A POWER TOOL

CROSS-REFERENCE TO RELATED APPLICATIONS

The present application claims priority to U.S. Provisional Patent Application 63/208,808 filed on Jun. 9, 2021, the disclosure of which is incorporated by reference herein in its entirety.

FIELD

The present disclosure relates generally to power tools having quick release blade assemblies, and more particularly to lawn mowers having quick release blade assemblies.

BACKGROUND

Lawnmowers typically utilize one or more rotating blades with sharpened edges to cut grass. As edges of the blades dull over time, it may be desirable to remove the blades from the lawnmower for sharpening or replacement.

Lawnmower blades are typically coupled to the lawnmower through a drive shaft using threaded fasteners. For instance, the drive shaft may include a threaded interface configured to receive a nut. After positioning the blade along the drive shaft, the nut can be secured to the threaded interface to secure the blade to the drive shaft. To avoid the blade from coming loose, nuts are tightened to high torque loads and the operator may use thread lock. Moreover, prolonged use may further tighten the threaded interface.

Removing the blades thus requires considerable effort and can expose the operator to bodily harm. For instance, when using a wrench to torque the nut loose, the operator might slip and cut themselves on the blade or another sharp object.

Accordingly, improved blade release systems are desired in the art. In particular, quick release blade systems which allow the operator to safely remove the blades would be advantageous.

BRIEF DESCRIPTION

Aspects and advantages of the invention in accordance with the present disclosure will be set forth in part in the following description, or may be obvious from the description, or may be learned through practice of the technology.

In accordance with one embodiment, a lawnmower is provided. The lawnmower includes a mower deck; a power source coupled to the mower deck; a motor selectively powered by the power source; a drive shaft coupled to the motor and defining an axis of rotation; and a quick release blade assembly operatively coupled to the drive shaft, the quick release blade assembly comprising: a base including an engagement interface; a retainer having a locking component; a blade disposed between the base and the retainer; and an actuatable member including an engagement member, the engagement member being selectively displaceable with respect to the engagement interface between a locked configuration and an unlocked configuration when the actuatable member is translated in a direction parallel with the axis of rotation, wherein the engagement member is configured to interface with the locking component to selectively couple the blade to the drive shaft when the engagement member is in the locked configuration.

In accordance with another embodiment, a quick release blade assembly for a lawnmower is provided. The quick release blade assembly includes a base including an engagement interface; a retainer having a locking component; a blade disposed between the base and the retainer; and an actuatable member including an engagement member, the engagement member being selectively displaceable with respect to the engagement interface between a locked configuration and an unlocked configuration when the actuatable member is translated in a direction parallel with the axis of rotation, wherein the engagement member is configured to interface with the locking component to selectively couple the blade to the drive shaft when the engagement member is in the locked configuration.

In accordance with another embodiment, a method of releasing or attaching a blade relative to a quick release blade assembly of a lawnmower, wherein the lawnmower includes a drive shaft coupled with a motor and configured to rotatably drive the blade. The method includes translating an actuatable member including an engagement member in a direction parallel with an axis of rotation of the drive shaft, wherein translating the actuatable member is performed such that the engagement member translates in a direction generally perpendicular with the axis of rotation, wherein translation of the engagement member in a first direction couples the engagement member with a locking component of a retainer of the quick release blade assembly, and wherein translation of the engagement member in a second direction uncouples the engagement member from the locking component.

These and other features, aspects and advantages of the present invention will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present invention, including the best mode of making and using the present systems and methods, directed to one of ordinary skill in the art, is set forth in the specification, which makes reference to the appended figures, in which.

DETAILED DESCRIPTION

Figure 1:
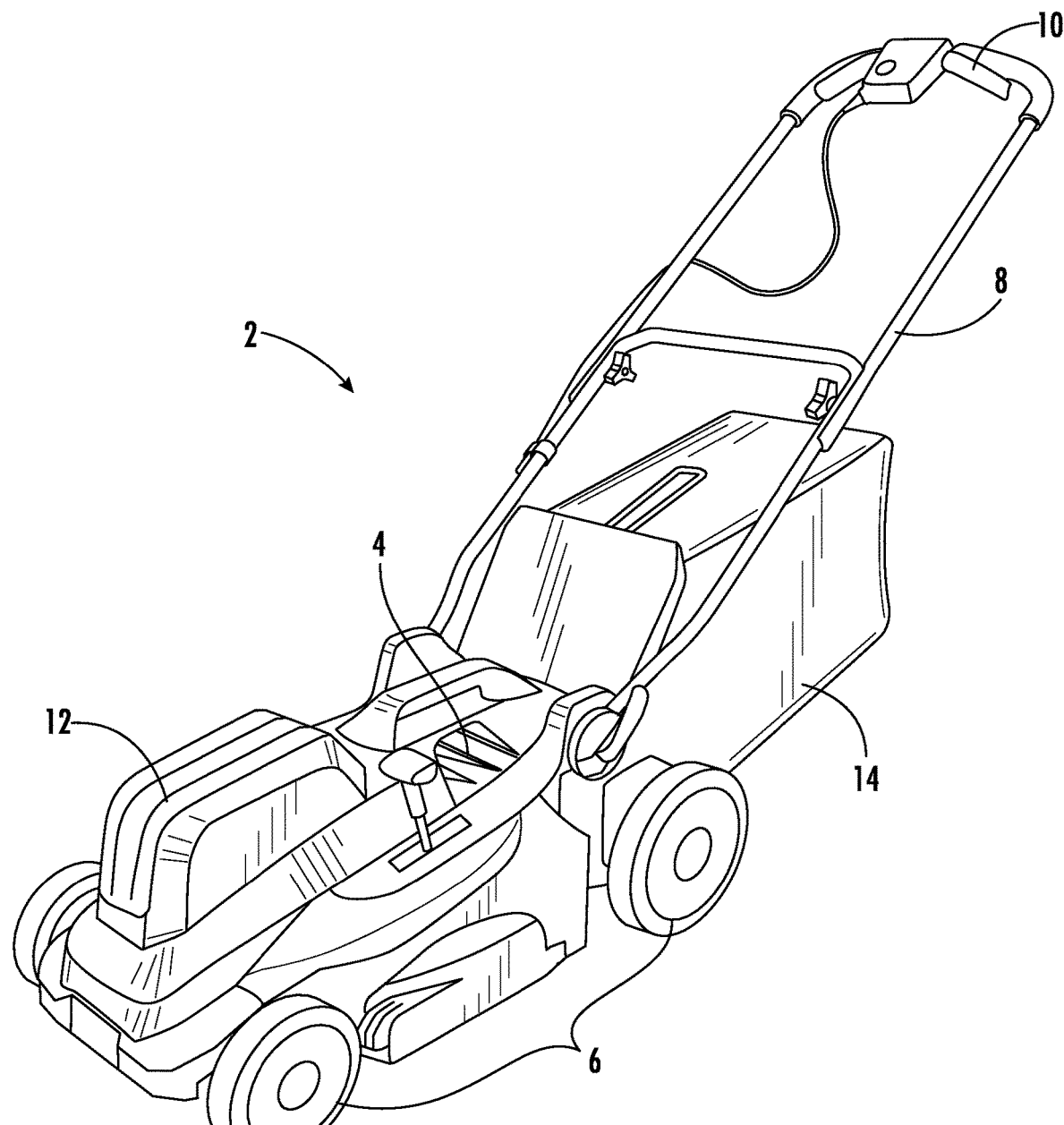
FIG. 1 is a perspective view of an exemplary lawn mower in accordance with embodiments of the present disclosure.

Reference now will be made in detail to embodiments of the present invention, one or more examples of which are illustrated in the drawings. The word "exemplary" is used herein to mean "serving as an example, instance, or illustration." Any implementation described herein as "exemplary" is not necessarily to be construed as preferred or advantageous over other implementations. Moreover, each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components. The singular forms "a," "an," and "the" include plural references unless the context clearly dictates otherwise. The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive- or and not to an exclusive- or. For example, a condition A or B is satisfied by any one of the following: A is true (or present) and B is false (or not present), A is false (or not present) and B is true (or present), and both A and B are true (or present).

Terms of approximation, such as "about," "generally," "approximately," or "substantially," include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Benefits, other advantages, and solutions to problems are described below with regard to specific embodiments. However, the benefits, advantages, solutions to problems, and any feature(s) that may cause any benefit, advantage, or solution to occur or become more pronounced are not to be construed as a critical, required, or essential feature of any or all the claims.

In general, lawnmowers in accordance with one or more embodiments described herein can include a quick release blade system configured to rapidly couple and uncouple lawn mower blades from a lawn mower without risk of injuring the operator. The quick release system can include an actuatable member which the operator can selectively displace to lock and unlock the blades from a drive shaft. The actuatable member includes engageable member(s) which are displaced in the radial direction in response to displacement of the actuatable member in a direction associated with an axis of rotation of the drive shaft. This quick release system can allow the operator to quickly and safely change blades while not compromising on structural integrity of the lawnmower and without risking the blades accidently detaching therefrom during use.

Referring now to the drawings, FIG. 1 illustrates an exemplary view of a lawnmower 2 in accordance with an exemplary embodiment of the present disclosure. The lawnmower 2 generally includes a mower deck 4 and a plurality of wheels 6 coupled to the mower deck 4. The wheels 6 may be driven, e.g., by a motor of the lawnmower 2, or be self-propelled, e.g., pushed by an operator.

The lawnmower 2 further includes a handle 8 extending from the mower deck 4. The handle 8 can include one or more user interfaces 10 which allow the operator to control one or more controllable elements of the lawnmower 2. For instance, the user interface(s) 10 may engage a motor (not illustrated) which is coupled to and drives the rotatable blade. The handle 8 can be adjustable such that the operator can adjust a relative height of the handle 8 to accommodate operators of different heights. The handle 8 may further be rotatable between a plurality of operating or storage configurations.

A power source 12 can be coupled to the mower deck 4. In an embodiment, the power source 12 can include an energy storage unit, such as a battery. In another embodiment, the power source 12 can include a gas engine. In yet another embodiment, the power source 12 can include a plug or cable configured to be coupled to an external power source, e.g., a wall outlet.

The power source 12 may be configured to drive a motor of the lawnmower 2. As described in greater detail hereinafter, the motor may be configured to rotatably drive a drive shaft defining an axis of rotation. A quick release blade assembly can be operatively coupled to the drive shaft and configured to detachably couple a blade to the drive shaft.

The lawnmower 2 can include a bag 14 for clippings ejected from a cutting area formed by the mower deck 4. In an embodiment, the bag 14 can be disposed behind the mower deck 4 underneath the handle 8.

Other types of lawnmowers are contemplated herein without departing from the scope of the disclosure. For example, the lawnmower can include a riding lawnmower having a platform for the operator to stand on or a seat for the operator to sit during use. In certain instances, the lawnmower can include a single blade. In other instances, the lawnmower can include two or more blades, such as two blades, three blades, or four blades.

The lawnmower may be configured to detect when the operator is removing one or more of the blade(s) and prevent the motor from rotatably driving the blades. By way of non-limiting example, the lawnmower may detect an angle of the mower deck 4 and prevent rotation of the blade(s) when the mower deck 4 exceeds a prescribed angle. Alternatively, the lawnmower can have a kill switch or other interface enabling the operator to prevent power supply to the motor.

Figure 2:
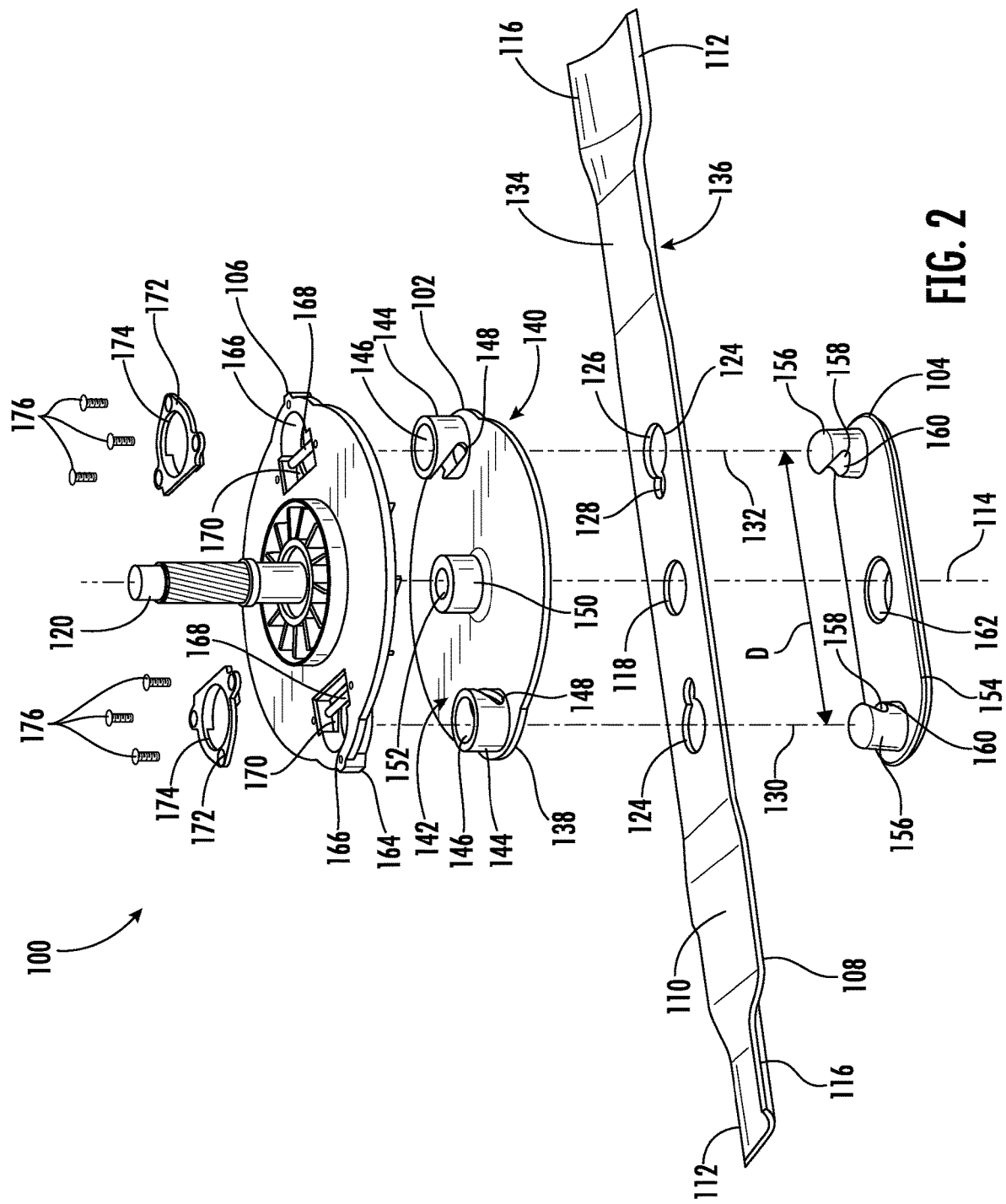
FIG. 2 is an exploded perspective view of a quick release blade assembly in accordance with embodiments of the present disclosure.

FIG. 2 illustrates an exploded view of a quick release blade assembly 100 in accordance with an exemplary embodiment. The quick release blade assembly 100 generally includes a base 102, a retainer 104, an actuatable member 106, and a blade 108. The components of the quick release blade assembly 100 can selectively couple the blade 108 to the lawnmower 2 and selectively uncouple the blade 108 from the lawnmower 2.

The blade 108 may include an elongated member 110 defining one or more cutting surfaces 112. In an embodiment, the one or more cutting surfaces 112 can be disposed at, or adjacent to, opposite ends of the elongated member 110. The cutting surfaces 112 may be rotationally symmetrical about a central axis 114 of the quick release blade assembly 100. As the elongated member 110 rotates about the central axis 114, the cutting surfaces 112 can cut grass, or other materials.

In an embodiment, the blade 108 can generally lie along a plane and include one or more flared portions 116 which may increase cutting efficiency of the lawnmower 2 by affecting the material being cut. In the illustrated embodiment, the blade 108 includes two flared portions 116 disposed at opposite ends of the elongated member 110 opposite the cutting surfaces 112.

Figure 3:
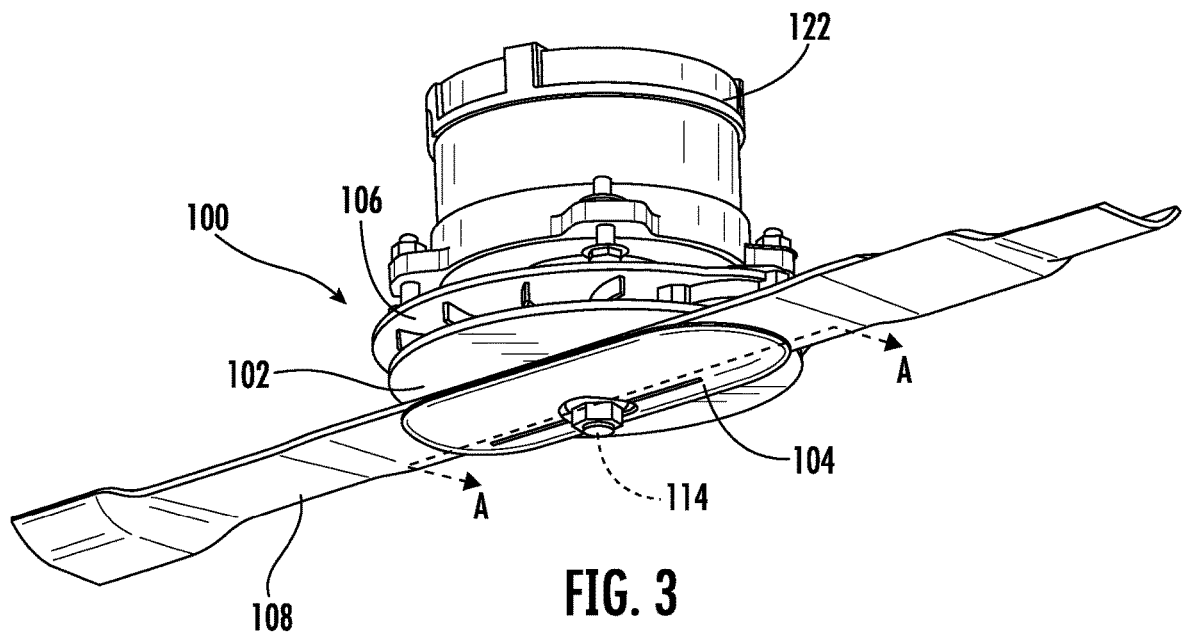
FIG. 3 is a perspective view of the quick release blade assembly with the blade coupled to a drive shaft in accordance with embodiments of the present disclosure.

A central opening 118 may extend through the blade 108 and receive a portion of a drive shaft 120 which extends from, or is coupled to, a drive motor 122 (FIG. 3). The opening 118 may additionally receive a bolt coupled to the drive shaft 120 which secures the base 102 to the drive shaft 120.

The blade 108 can further include one or more openings 124 spaced apart from the central axis 114, i.e., displaced from a central location of the blade 108. The openings 124 may include one opening, two openings, three openings, four openings, or the like. In the illustrated embodiment, the openings 124 include two openings 124 equally spaced apart from the central axis 114. The openings 124 are each depicted as having multi-circular shapes including a first circular opening 126 and a second circular opening 128 in open communication with the first circular opening 126. In another embodiment, the openings 124 can each include a single circular opening. In yet another embodiment, the openings 124 can have non-circular shapes, including, e.g., one or more arcuate portions or one or more linear portions. In certain instances, the openings 124 can be disposed along the blade 108 such that the openings 124 are rotationally symmetrical about the central axis 114.

Each of the openings 124 can define an effective centerline, depicted in FIG. 2 as dashed lines 130 and 132. In an embodiment, both of the centerlines 130 and 132 can correspond with a middle of a respective opening 124. The centerlines 130 and 132 can be spaced apart from one another by a distance, D. As described in greater detail hereinafter, the distance D can be the same, or approximately the same, for components in each of the base 102, the retainer 104, and the actuatable member 106. These components can be joined together at interfaces along the centerlines 130 and 132.

The blade 108 can be disposed between (e.g., sandwiched between) the base 102 and the retainer 104 such that a first surface 134 of the blade 108 is disposed adjacent to the base 102 and a second surface 136 of the blade 108 is disposed adjacent to the retainer 104. In certain instances, the blade 108 can directly contact one or both of the base 102 or retainer 104. In other instances, the blade 108 can be spaced apart from either or both of the base 102 or retainer 104, e.g., by a dampener or other intermediary element.

The base 102 can include a body 138 against which the blade 108 rests when the blade 108 is retained by the quick release blade assembly 100. In a particular embodiment, the base 102 can include a first surface 140 and a second surface 142. The second surface 142 can be disposed opposite the first surface 140 and can include one or more receiving areas 144 extending therefrom. In certain instances, the number of receiving areas 144 can correspond with the number of openings 124 in the blade 108. In the illustrated embodiment, the receiving areas 144 are defined by projections extending in a direction parallel with the center axis 114. The receiving areas 144 can each include openings 146 having centerlines aligned with (e.g., disposed in coaxial alignment with) the centerlines 130 and 132 of the openings 124. That is, the centerlines of the openings 146 of the receiving areas 144 can be spaced apart from one another by the distance D.

The receiving areas 144 can each include an engagement interface 148. The engagement interfaces 148 can each include a slot extending into the receiving area 144. The slots can be in open communication with the openings 146. The slots can be angularly offset (i.e., canted) from the central axis 114. By way of example, the slots can be angularly offset from the central axis 114 by at least 1 degree, such as at least 2 degrees, such as at least 3 degrees, such as at least 4 degrees, such as at least 5 degrees, such as at least 10 degrees, such as at least 20 degrees, such as at least 30 degrees, such as at least 40 degrees, such as at least 50 degrees, such as at least 60 degrees. In a particular embodiment, the slots can be angularly offset from the central axis 114 by approximately 45 degrees. In an embodiment, the slots can each lie along best fit planes that intersect on a side of the base 102 corresponding with the second surface 142. That is, the slots can be tilted (cant) inward from the second surface 142 towards the actuatable member 106. The engagement interfaces 148 can act as guides for engagement member(s) of the actuatable member 106, as described in greater detail hereinafter.

One or more extensions, e.g., extension 150, can extend from the second surface 142 of the base 102 towards the actuatable member 106. In the illustrated embodiment, the extension 150 is disposed along the central axis 114 of the quick release blade assembly 100. The extension 150 includes an aperture 152 through which the drive shaft 120 can at least partially extend.

The retainer 104 can include a body 154 having one or more posts 156 extending from the body 154. The posts 156 can extend from the body 154 in a direction parallel, or generally parallel, with the central axis 114. Similar to the receiving areas 144, the one or more posts 156 can be aligned (e.g., coaxial) with the centerlines 130 and 132 of the openings 124 such that the posts 156 are spaced apart from one another by the distance D. The number of posts 156 can correspond with the number of openings 124 in the blade 108. In such a manner, each one of the posts 156 can extend through one of the openings 124 of the blade 108 and into an opening 146 of a corresponding receiving area 144 of the base 102.

At least one of the posts 156 can define a locking component 158 configured to interface with a respective engagement interface 148 of the receiving area 144 in the base 102. In the depicted embodiment, the locking components 158 each include a cutout in a surface of one of the posts 156. The cutouts can include, for example, notches, each forming a locking surface 160. In an embodiment, the locking surface 160 can define a generally planar surface, or a surface lying along a best fit plane, that is oriented perpendicular, or generally perpendicular, with the central axis 114. The locking component 158 can define a depth, as measured in the radial direction (perpendicular to the central axis 114), sufficiently large so as to receive an engagement member of the actuatable member 106 such that the engagement member is disposed within a boundary of the post 156 so as to lock the post 156 relative to the base 102.

The body 154 of the retainer 104 can further include an opening 162 configured to receive the drive shaft 120. The opening 162 can be centrally disposed along the body 154.

The actuatable member 106 can include a body 164, e.g., a plate, selectively displaceable with respect to the base 102 between a locked configuration and an unlocked configuration. In an embodiment, the actuatable member 106 can be displaceable in a direction parallel with the central axis 114.

The body 164 of the actuatable member 106 can define one or more openings 166. The openings 166 can be aligned (e.g., coaxial) with the centerlines 130 and 132 of the openings 124 such that the posts 156 and the receiving areas 144 can be received therein. Each opening 166 can have an engagement member. By way of non-limiting example, each of the engagement members can include a pin 168. The pins 168 can have generally cylindrical shapes with axis oriented perpendicular to the central axis 114. The pins 168 can rest along shoulders 170 disposed in the openings 166. Each opening 166 can include shoulders 170 disposed at each longitudinal end of the pin 168. The shoulders 170 can support the pins 168 and allow the pins 168 to displace in a direction perpendicular to the central axis 114 and perpendicular to the axis of the pins 168. In certain instances, displacement of the pins 168 in the radial direction can cause rotation of the pins 168.

The pins 168 can be displaced in the radial direction between a radially innermost position and a radially outermost position within the openings 166. With the pins 168 in a first position corresponding with a radially inner side of the opening 166, the receiving areas 144 and posts 156 can be inserted into the openings 166. That is, the pins 168 do not block the receiving areas 144 and posts 156 from being inserted into the openings 166. During insertion of the receiving areas 144 and posts 156 into the openings 166, the pins 168 can be guided by the engagement interfaces 148 such that they are radially displaced outward and into the locking components 158. Once interfaced with the locking components 158, the pins 168 can secure the retainer 104 to the base 102.

In one or more embodiments, the pins 168 may not apply significant lateral force along the engagement interfaces 148 when the mower is not running. As rotation of the drive shaft 120 increases, the mass of the pins 168 can increase lateral force exhibited against the engagement interfaces 148, pulling the body 154 tighter against the blade 108. The pins 168 may not bottom out within the engagement interfaces 148, thus allowing the components of the quick release blade assembly 100 to remain tight during operational use.

The pins 168 can be maintained in the openings 166 through the use of pin covers 172. In certain instances, the pin covers 172 can define openings 174 configured to receive at least one of the receiving areas 144 and the posts 156. The pin covers 172 can be selectively retained on the actuatable member 106 by one or more fasteners 176, e.g., threaded or non-threaded fasteners.

Figure 4:
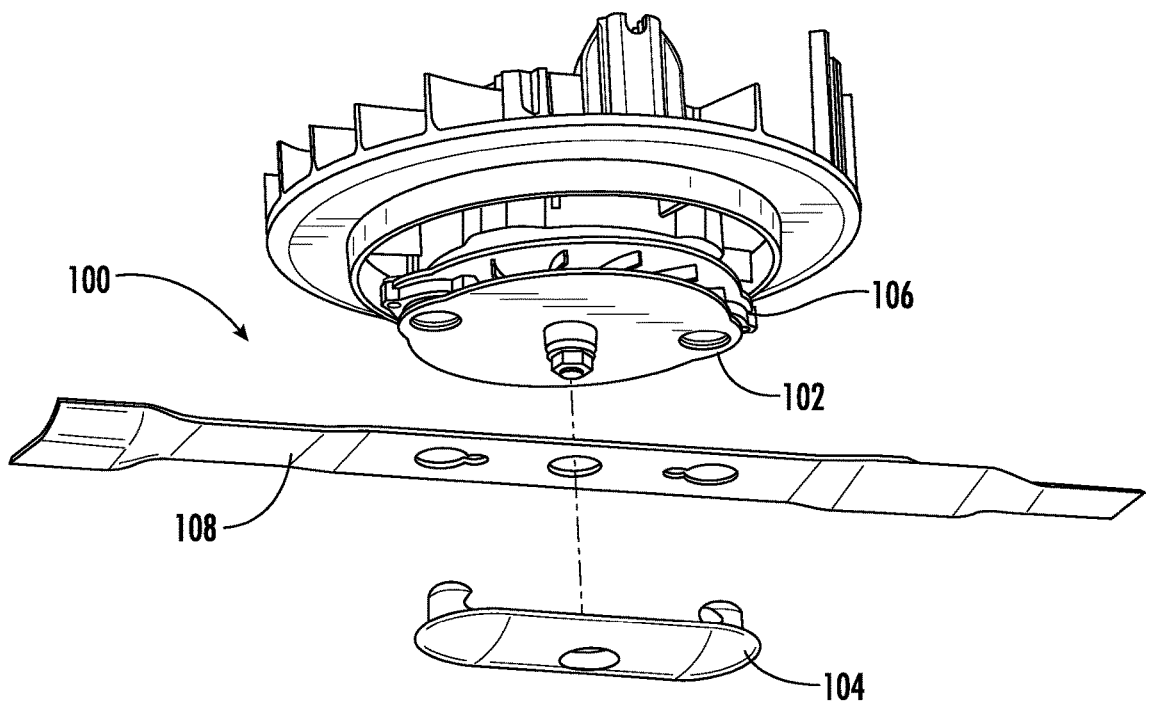
FIG. 4 is a perspective view of the quick release blade assembly with the blade decoupled from the drive shaft in accordance with embodiments of the present disclosure.

FIG. 3 illustrates an embodiment of the quick release blade assembly 100 with the blade 108 attached. FIG. 4 illustrates an embodiment of the quick release blade assembly 100 with the blade and retainer 104 detached such that the blade 108 can be replaced or serviced. To release the blade 108, the actuation member 106 is translated in a direction parallel with the central axis 114. In particular, the actuation member 106 can be translated towards the motor 122 to release the blade 108. Once released, the retainer 104 and blade 108 can be removed while the base 102 and actuation member 106 remain attached to the lawnmower.

Figure 5:
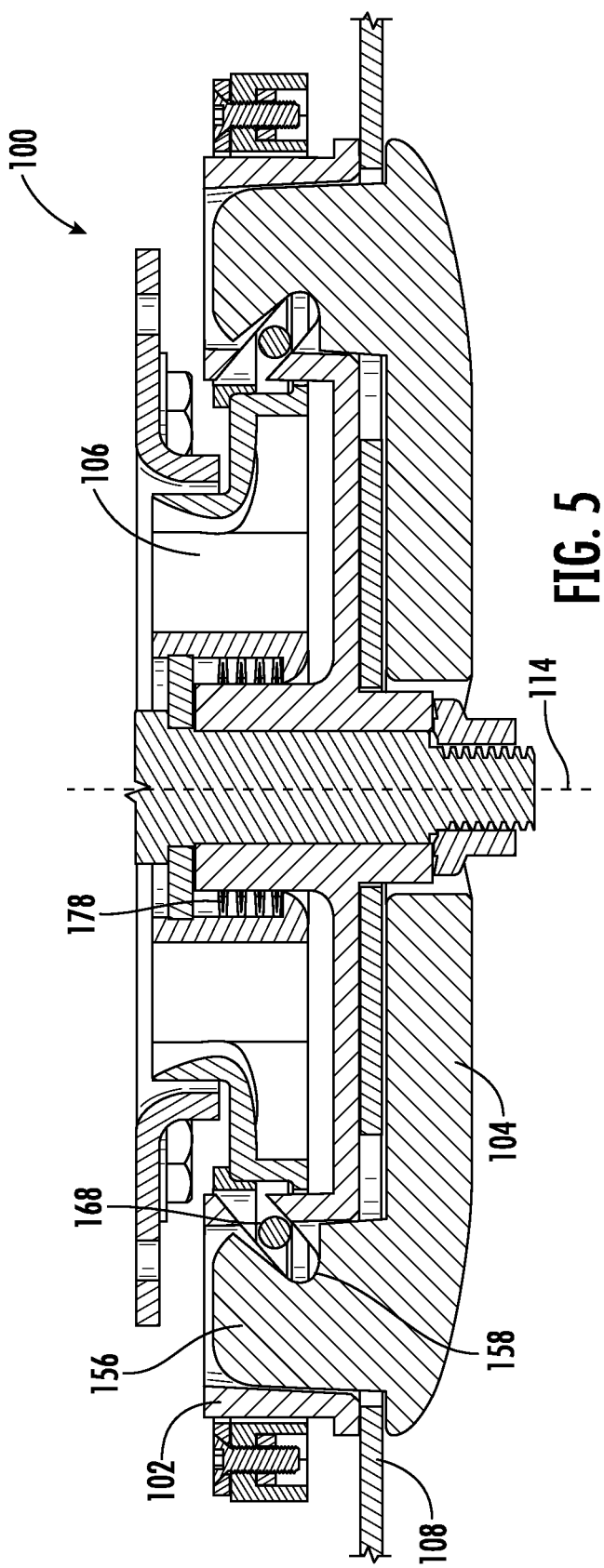
FIG. 5 is a cross-sectional side view of the quick release blade assembly of FIG. 3 as seen along Line A-A in accordance with embodiments of the present disclosure.

FIG. 5 illustrates a cross-sectional view of the quick release blade assembly 100 in accordance with an exemplary embodiment as seen along line A-A in FIG. 3. As depicted, in one or more embodiments, the quick release blade assembly 100 can further include a biasing element, e.g., a spring 178 configured to bias the actuation member 106 in a direction parallel with the central axis 114. In particular, the spring 178 can bias the actuation member 106 in a direction toward the retainer 104. The operator can unlock the quick release blade assembly 100 by displacing the actuation member 106 away from the retainer 104, and thus against the spring force generated by the spring 178. As the actuation member 106 is displaced to the open configuration, the pins 168 are displaced in the radial direction so as to clear the locking component 158 and allow the posts 156 to release from the receiving areas 144.

In certain instances, the quick release blade assembly 100 may be configured to generate an indication when the actuation member 106 is in the unlocked configuration. For example, the quick release blade assembly 100 may be configured to generate a tactile indication, an audible indication, a visual indication, or a combination thereof.

Figure 6:
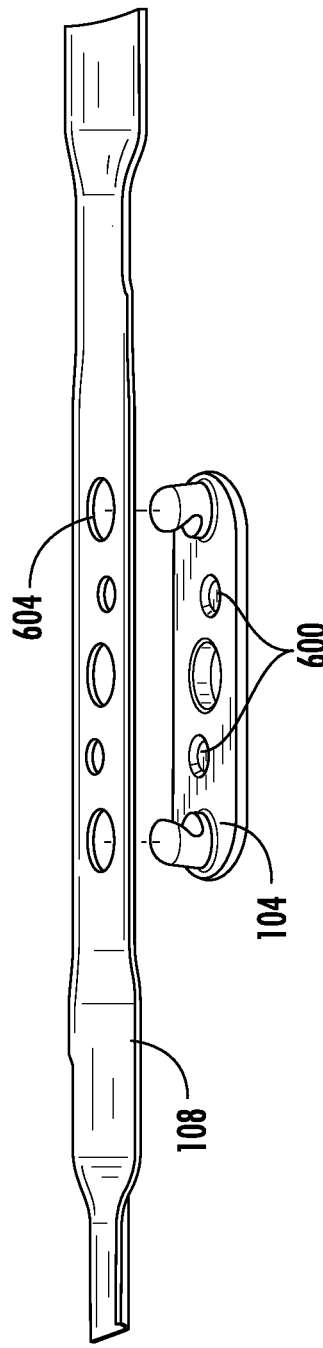
FIG. 6 is a top perspective view of a portion of the quick release blade assembly in accordance with embodiments of the present disclosure.
Figure 7:
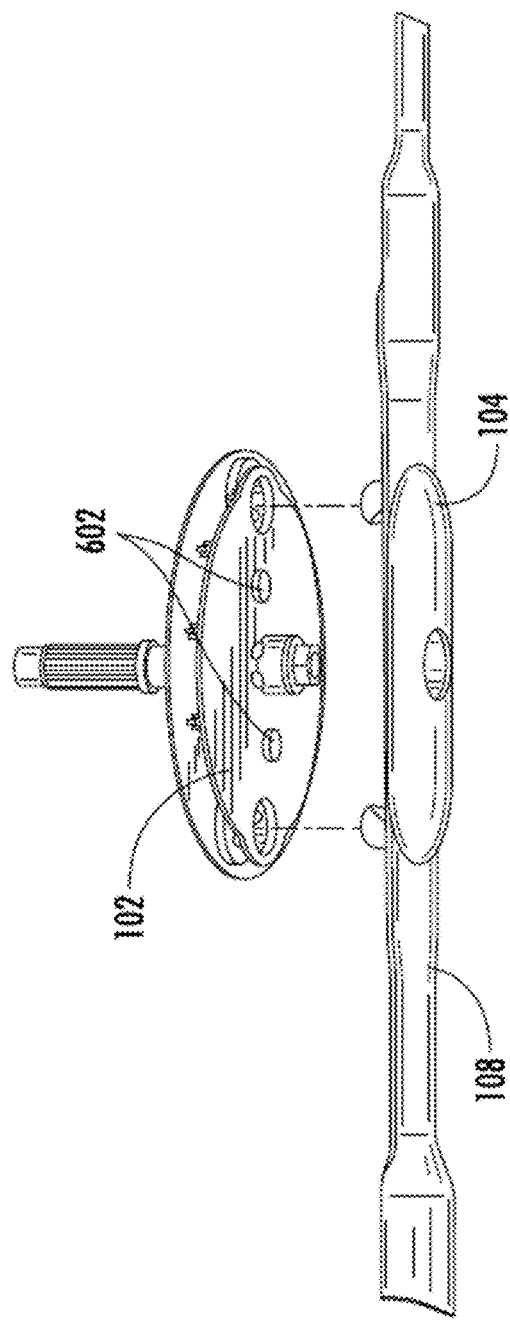
FIG. 7 is a bottom perspective view of a portion of the quick release blade assembly in accordance with embodiments of the present disclosure.

FIGS. 6 and 7 illustrate an orientation feature including a first orientation element 600 disposed on the retainer 104 and a second orientation element 602 disposed on the base 102. The first orientation element 600 can include, for example, a recess configured to receive the second orientation element 602. The second orientation element 602 can include, for example, a post configured to extend into the first orientation element 600. In accordance with other embodiments, the post and recess can be switched such that the first orientation element 600 includes a post and the second orientation element 602 includes a recess. The first and second orientation elements 600 and 602 can include non-reversible elements which do not allow for improper installation of the retainer 104. For example, the first and second orientation elements 600 and 602 can prevent the retainer 104 from being installed in an incorrect, e.g., reverse, orientation. If an operator attempts to use the retainer 104 in an incorrect orientation, the first and second orientation elements 600 and 602 can be out of alignment with one another, thus disallowing proper installation and assembly of the retainer 104. In an embodiment, at least one of the first or second orientation elements 600 or 602 can extend through the blade 108 to interface with the other of the first or second orientation elements 600 or 602. The blade 108 may include openings 604 for the first or second orientation elements 600 or 602. In other embodiments, the orientation feature can be integral with the blade 108.

Figure 8:
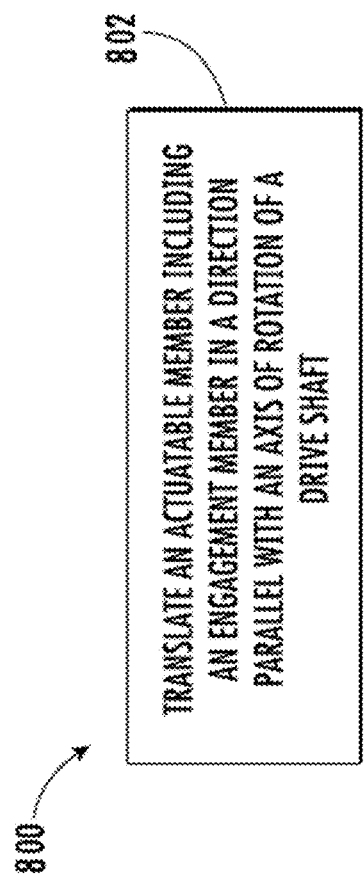
FIG. 8 is a flow chart of a method of releasing or attaching a blade relative to a quick release blade assembly of a lawnmower in accordance with embodiments of the present disclosure.

FIG. 8 is a flowchart of an exemplary method 800 of releasing or attaching a blade relative to a quick release blade assembly of a lawnmower, such as the aforementioned lawnmower 2. The method 800 includes a step 802 of translating an actuatable member including an engagement member in a direction parallel with an axis of rotation of a drive shaft. In a particular embodiment, the step 802 can be performed by translating the actuatable member toward a motor of the lawnmower. In certain instances, the actuatable member can be spring biased to the locked configuration. By translating the actuatable member towards the motor, an operator can selectively move the actuatable member from a normally locked configuration (as maintained by the spring) to the unlocked configuration. More specifically, in accordance with an embodiment, translating the actuatable member towards the motor can cause the engagement members to translate in a radially inward direction such that the posts of the retainer are free to translate past the engagement members. It should be understood that the layout described above can be reversed such that in other embodiments the engagement members move to the unlocked configuration by translating in the radially outward direction.

Quick release blade assemblies in accordance with embodiments described herein may allow an operator to quickly and easily attach and detach blades from the lawnmower without requiring use of tools. Moreover, the force required to attach and detach blades from the lawnmower is reduced such that the risk of harm is reduced.

Further aspects of the invention are provided by one or more of the following embodiments:

Embodiment 1. A lawnmower comprising: a mower deck; a power source coupled to the mower deck; a motor selectively powered by the power source; a drive shaft coupled to the motor and defining an axis of rotation; and a quick release blade assembly operatively coupled to the drive shaft, the quick release blade assembly comprising: a base including an engagement interface; a retainer having a locking component; a blade disposed between the base and the retainer; and an actuatable member including an engagement member, the engagement member being selectively displaceable with respect to the engagement interface between a locked configuration and an unlocked configuration when the actuatable member is translated in a direction parallel with the axis of rotation, wherein the engagement member is configured to interface with the locking component to selectively couple the blade to the drive shaft when the engagement member is in the locked configuration.

Embodiment 2. The lawnmower of any one or more of the embodiments, wherein the retainer comprises a post extending in a direction parallel with the axis of rotation, and wherein the locking component comprises a cutout in a surface of the post.

Embodiment 3. The lawnmower of any one or more of the embodiments, wherein the blade comprises an opening configured to receive the post of the retainer, and wherein the opening is displaced from a central location of the blade.

Embodiment 4. The lawnmower of any one or more of the embodiments, wherein the base comprises a post configured to receive the locking component of the retainer, wherein the engagement interface comprises a slot extending into the post, and wherein the slot lies along a plane that is angularly offset from the axis of rotation.

Embodiment 5. The lawnmower of any one or more of the embodiments, wherein the engagement member is disposed in the slot when the engagement member is in the locked configuration, and wherein the engagement member is disposed external to the slot when the engagement member is in the unlocked configuration.

Embodiment 6. The lawnmower of any one or more of the embodiments, wherein the actuatable member comprises a body defining an opening, wherein the engagement member comprises a pin disposed at least partially in the opening, and wherein the pin is displaceable between the locked and unlocked configurations in a direction generally perpendicular to the axis of rotation.

Embodiment 7. The lawnmower of any one or more of the embodiments, wherein the pin is contained in the opening by a pin cover, the pin cover being selectively coupled with the body of the actuatable member.

Embodiment 8. The lawnmower of any one or more of the embodiments, wherein the retainer and blade are removable from the lawn mower when the engagement member is in the unlocked configuration, and wherein the base and actuatable member remain engaged with the lawn mower when the engagement member is in the unlocked configuration.

Embodiment 9. The lawnmower of any one or more of the embodiments, wherein the actuatable member is in a first position when the engagement member is in the locked configuration, wherein the actuatable member is in a second position when the engagement member is in the unlocked configuration, and wherein the actuatable member is disposed closer to the motor when disposed in the first position.

Embodiment 10. A quick release blade assembly operatively coupled to a drive shaft of a lawnmower, the drive shaft defining an axis of rotation, the quick release blade assembly comprising: a base including an engagement interface; a retainer having a locking component; a blade disposed between the base and the retainer; and an actuatable member including an engagement member, the engagement member being selectively displaceable with respect to the engagement interface between a locked configuration and an unlocked configuration when the actuatable member is translated in a direction parallel with the axis of rotation, wherein the engagement member is configured to interface with the locking component to selectively couple the blade to the drive shaft when the engagement member is in the locked configuration.

Embodiment 11. The quick release blade assembly of any one or more of the embodiments, wherein the retainer comprises a post extending in a direction parallel with the axis of rotation, and wherein the locking component comprises a cutout in a surface of the post.

Embodiment 12. The quick release blade assembly of any one or more of the embodiments, wherein the base comprises a post configured to receive the locking component of the retainer, wherein the engagement interface comprises a slot extending into the post, and wherein the slot lies along a plane that is angularly offset from the axis of rotation.

Embodiment 13. The quick release blade assembly of any one or more of the embodiments, wherein the engagement member is disposed in the slot when the engagement member is in the locked configuration, and wherein the engagement member is disposed external to the slot when the engagement member is in the unlocked configuration.

Embodiment 14. The quick release blade assembly of any one or more of the embodiments, wherein the actuatable member comprises a plate defining an opening, wherein the engagement member comprises a pin disposed at least partially in the opening, and wherein the pin is displaceable between the locked and unlocked configurations in a direction generally perpendicular to the axis of rotation.

Embodiment 15. The quick release blade assembly of any one or more of the embodiments, wherein the actuatable member is in a first position when the engagement member is in the locked configuration, wherein the actuatable member is in a second position when the engagement member is in the unlocked configuration, and wherein the actuatable member is disposed closer to a motor when disposed in the first position.

Embodiment 16. The quick release blade assembly of any one or more of the embodiments, wherein the retainer and blade are removable from the lawn mower when the engagement member is in the unlocked configuration, and wherein the base and actuatable member remain engaged with the lawn mower when the engagement member is in the unlocked configuration.

Embodiment 17. The quick release blade assembly of any one or more of the embodiments, wherein the actuatable member is biased in a direction along the axis of rotation in a direction to maintain the engagement member in the locked configuration.

Embodiment 18. A method of releasing or attaching a blade relative to a quick release blade assembly of a lawnmower, wherein the lawnmower includes a drive shaft coupled with a motor and configured to rotatably drive the blade, the method comprising: translating an actuatable member including an engagement member in a direction parallel with an axis of rotation of the drive shaft, wherein translating the actuatable member is performed such that the engagement member translates in a direction generally perpendicular with the axis of rotation, wherein translation of the engagement member in a first direction couples the engagement member with a locking component of a retainer of the quick release blade assembly, and wherein translation of the engagement member in a second direction uncouples the engagement member from the locking component.

Embodiment 19. The method of any one or more of the embodiments, wherein the engagement member comprises a pin, and wherein the pin is configured to move within a slot of the retainer, the slot being angularly offset from the axis of rotation by an angle in a range of 30 degrees and 60 degrees.

Embodiment 20. The method of any one or more of the embodiments, wherein the method further comprises removing the retainer and blade from the quick release blade assembly when the engagement member is in an unlocked configuration.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A lawnmower comprising:
   a mower deck;
   a power source coupled to the mower deck;
   a motor selectively powered by the power source;
   a drive shaft coupled to the motor and defining an axis of rotation; and
   a quick release blade assembly operatively coupled to the drive shaft, the quick release blade assembly comprising:
     a base including an engagement interface;
     a retainer having a locking component;
     a blade disposed between the base and the retainer; and
     an actuatable member including an engagement member, the engagement member being selectively displaceable with respect to the engagement interface between a locked configuration and an unlocked configuration when the actuatable member is translated in a direction parallel with the axis of rotation,
     wherein the engagement member is configured to interface with the locking component to selectively couple the blade to the drive shaft when the engagement member is in the locked configuration, and
     wherein the base and the retainer are separable from one another when the engagement member is in the unlocked configuration.

2. The lawnmower of claim 1, wherein the retainer comprises a post extending in a direction parallel with the axis of rotation, and wherein the locking component comprises a cutout in a surface of the post.

3. The lawnmower of claim 2, wherein the blade comprises an opening configured to receive the post of the retainer, and wherein the opening is displaced from a central location of the blade.

4. The lawnmower of claim 1, wherein the base comprises a post configured to receive the locking component of the retainer, wherein the engagement interface comprises a slot extending into the post, and wherein the slot lies along a plane that is angularly offset from the axis of rotation.

5. The lawnmower of claim 4, wherein the engagement member is disposed in the slot when the engagement member is in the locked configuration, and wherein the engagement member is disposed external to the slot when the engagement member is in the unlocked configuration.

6. The lawnmower of claim 1, wherein the actuatable member comprises a body defining an opening, wherein the engagement member comprises a pin disposed at least partially in the opening, and wherein the pin is displaceable between the locked and unlocked configurations in a direction generally perpendicular to the axis of rotation.

7. The lawnmower of claim 6, wherein the pin is contained in the opening by a pin cover, the pin cover being selectively coupled with the body of the actuatable member.

8. The lawnmower of claim 1, wherein the retainer and blade are removable from the lawn mower when the engagement member is in the unlocked configuration, and wherein the base and actuatable member remain engaged with the lawn mower when the engagement member is in the unlocked configuration.

9. The lawnmower of claim 1, wherein the actuatable member is in a first position when the engagement member is in the locked configuration, wherein the actuatable member is in a second position when the engagement member is in the unlocked configuration, and wherein the actuatable member is disposed closer to the motor when disposed in the first position.

10. A quick release blade assembly operatively coupled to a drive shaft of a lawnmower, the drive shaft defining an axis of rotation, the quick release blade assembly comprising:
    a base including an engagement interface;
    a retainer having a locking component;
    a blade disposed between the base and the retainer; and
    an actuatable member including an engagement member, the engagement member being selectively displaceable with respect to the engagement interface between a locked configuration and an unlocked configuration when the actuatable member is translated in a direction parallel with the axis of rotation,
    wherein the engagement member is configured to interface with the locking component to selectively couple the blade to the drive shaft when the engagement member is in the locked configuration, and
    wherein the base and the retainer are separable from one another when the engagement member is in the unlocked configuration.

11. The quick release blade assembly of claim 10, wherein the retainer comprises a post extending in a direction parallel with the axis of rotation, and wherein the locking component comprises a cutout in a surface of the post.

12. The quick release blade assembly of claim 10, wherein the base comprises a post configured to receive the locking component of the retainer, wherein the engagement interface comprises a slot extending into the post, and wherein the slot lies along a plane that is angularly offset from the axis of rotation.

13. The quick release blade assembly of claim 12, wherein the engagement member is disposed in the slot when the engagement member is in the locked configuration, and wherein the engagement member is disposed external to the slot when the engagement member is in the unlocked configuration.

14. The quick release blade assembly of claim 10, wherein the actuatable member comprises a plate defining an opening, wherein the engagement member comprises a pin disposed at least partially in the opening, and wherein the pin is displaceable between the locked and unlocked configurations in a direction generally perpendicular to the axis of rotation.

15. The quick release blade assembly of claim 10, wherein the actuatable member is in a first position when the engagement member is in the locked configuration,
wherein the actuatable member is in a second position when the engagement member is in the unlocked configuration, and wherein the actuatable member is disposed closer to a motor of the lawnmower when disposed in the first position.

16. The quick release blade assembly of claim 10, wherein the retainer and blade are removable from the lawn mower when the engagement member is in the unlocked configuration, and wherein the base and actuatable member remain engaged with the lawn mower when the engagement member is in the unlocked configuration.

17. The quick release blade assembly of claim 10, wherein the actuatable member is biased in a direction along the axis of rotation in a direction to maintain the engagement member in the locked configuration.

18. A method of releasing or attaching a blade relative to a quick release blade assembly of a lawnmower, wherein the quick release blade assembly includes a base and the lawnmower includes a drive shaft coupled with a motor and configured to rotatably drive the blade, the method comprising:
translating an actuatable member including an engagement member in a direction parallel with an axis of rotation of the drive shaft, wherein translating the actuatable member is performed such that the engagement member translates in a direction generally perpendicular with the axis of rotation, wherein translation of the engagement member in a first direction couples the engagement member with a locking component of a retainer of the quick release blade assembly, and wherein translation of the engagement member in a second direction uncouples the engagement member from the locking component such that the base and the retainer are separable from one another.

19. The method of claim 18, wherein the engagement member comprises a pin, and wherein the pin is configured to move within a slot defined by the retainer, the slot being angularly offset from the axis of rotation by an angle in a range of 30 degrees and 60 degrees.

20. The method of claim 18, wherein the method further comprises removing the retainer and blade from the quick release blade assembly when the engagement member is in an unlocked configuration.

* * * * *